Aug. 12, 1958  
L. G. MOSIER  
2,846,888  
ELECTRICAL NUTATION DAMPING MECHANISM FOR  
CONSTRAINED EDDY CURRENT GYROSCOPE  
Filed Sept. 29, 1955
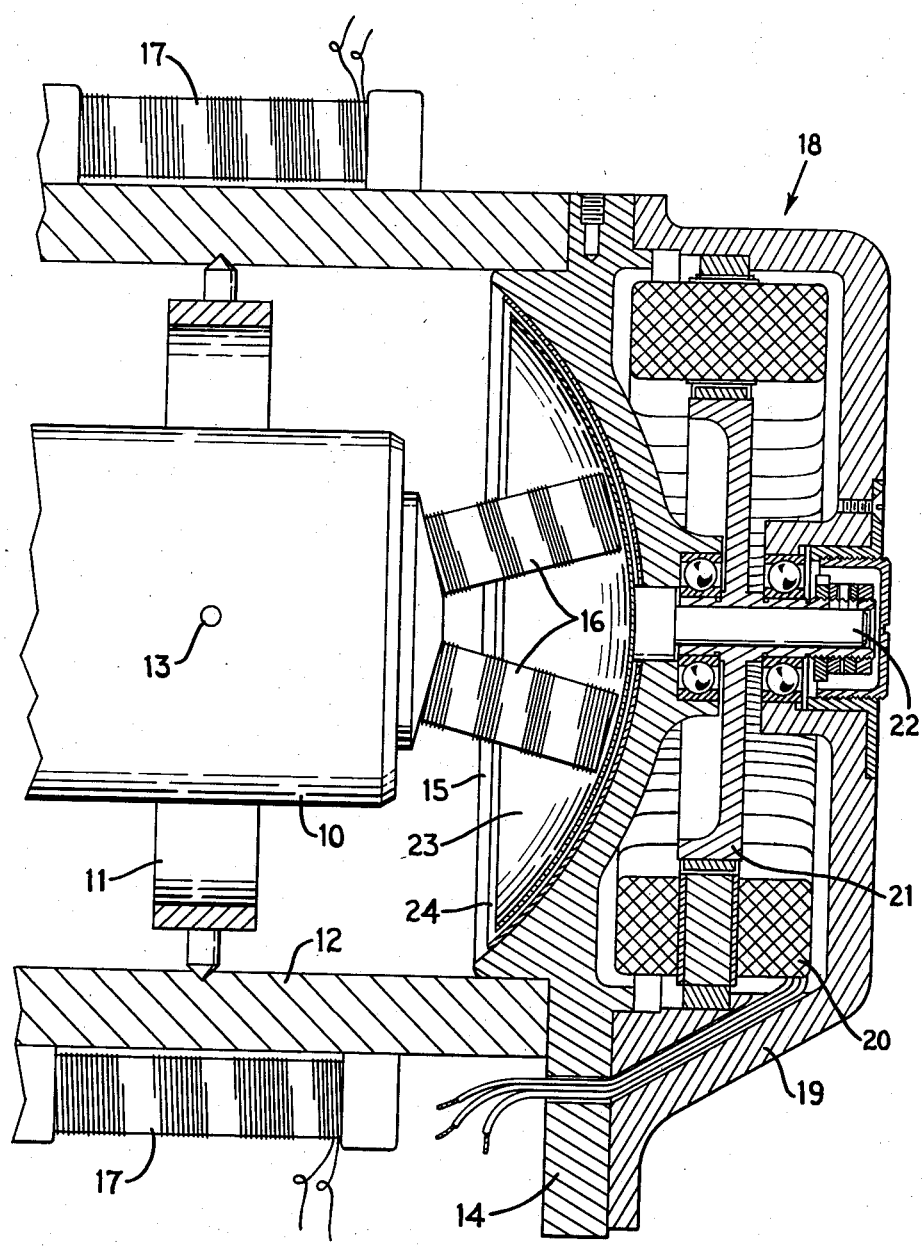
INVENTOR.  
LLOYD G. MOSIER  
BY  
*J. D. O'Brien*  
*H. H. Loscke*  
ATTYS.

United States Patent Office 2,846,888
Patented Aug. 12, 1958

2,846,888

ELECTRICAL NUTATION DAMPING MECHANISM FOR CONSTRAINED EDDY CURRENT GYROSCOPE

Lloyd G. Mosier, Glen Burnie, Md., assignor to the United States of America as represented by the Secretary of the Navy Application September 29, 1955, Serial No. 537,603

5 Claims. (Cl. 74—5.5)

(Granted under Title 35, U. S. Code (1952), sec. 266)

The invention described herein may be manufactured and used by or for the Government of the United States of America for governmental purposes without the payment of any royalties thereon or therefor.

This invention relates to gyroscopes and more particularly to eddy current nutation damping means for constrained gyroscopes which have no moving parts to introduce any factors of friction in the damping operation.

In prior known devices nutation dampers are of the mechanical friction type. These mechanical dampers are effective only near resonance necessitating critical adjustment thereof to avoid undue interference with the free operation of the gyroscope. A varying constraint on the gyroscope by a mechanical damper causes a shift of nutation frequency away from the resonant frequency of the mechanical system which causes a decrease of the damping operation. Mechanical dampers that have minimized or substantially eliminated most of these disadvantages usually lead to large steady state errors in the gyroscope.

In the present invention an eddy current nutation damping disc is fixed to the frame of the gyroscope in the magnetic path and in close air-spaced relation with the erection or control coils producing the magnetic field to dampen nutations of the gyroscope by the eddy current energy induced in the damping disc. While the nutation damper means of this invention is particularly well adapted for the type of gyroscope shown and described in the application for Letters Patent of E. F. Echolds and P. L. Brink filed on April 9, 1954, and bearing the Serial No. 422,282 to an Eddy Current Force System for Constrained Gyroscope, this damper means is readily adaptable for most all constrained gyroscopes. It is therefore a general object of this invention to provide an electrical nutation damper means for constrained gyroscopes capable of producing electromotive forces opposing nutating movements of a gyroscope having limited constrained movement.

These and other objects, advantages, features, and uses will become more apparent as the description proceeds when taken in consideration of the accompanying drawing in which a single figure illustrates the invention in its environment in cross-section with parts shown in broken-away elevation.

Referring to the figure of drawing, an encased gyroscope 10, shown partly broken away, is supported by a suitable gimbal ring 11 on a frame 12 in the usual and well recognized manner with the gimbal axes intersection at 13 at the gravitational center of the gyroscope 10. On the end of the frame 12 is an end plate 14 having a concave spherical face 15 on the side of the gyroscope 10 with the center of curvature at the intersection of the gimbal axes, or at 13. Fixed on the end of the gyroscope case 10 are a plurality of electromagnetic poles, herein illustrated as a pair 16, which are on lines radiating from the center 13 at small equal angles from the longitudinal centerline of the gyroscope 10. The electromagnetic poles 16 will generally be referred to herein as control coils and the outer ends thereof are in close air-spaced relation with the concave face 15 of the end plate 14. Also fixed to the frame 12 are a plurality of range coils 17 to produce a flux through the end plates 14, across the air-space, and through the gyroscope case as more fully described in the aforementioned patent application of E. F. Echolds and P. L. Brink. The end plate 14 supports an electric motor thereon, generally referred to by the reference character 18, which consists of a case 19, a stator 20, and a rotor 21 on a shaft 22, as is well understood in the electric motor art. The motor shaft 22 supports a spherical eddy current disc 23 which is provided as shown to spin in the air-space between the control coil 16 ends and the end plate 14. All of the above construction and the operation thereof is fully set forth in the above-mentioned application of E. F. Echolds and P. L. Brink and will not be detailed herein since the specific construction is not material to the present invention and is used herein for the purpose of illustration. The present invention, soon to be described, is, however, to be used in constrained gyroscopes of the type having a flux path between the gyroscope case and frame in a manner shown and described herein, or having a pole cooperating with an eddy current disc. The range coils 17 control the sensitivity of the gyroscope deflections and the control coils 16 control the deflections off-center of the gyroscope to provide for various factors to be accounted for, as wind velocity, trajectory, etc. when the gyroscope is used as a computing device in a gun fire control system, or the like. The gyroscope may be single ended or double ended.

The invention herein comprises a highly conductive spherical nutation damper disc 24 which is fixed or secured on the concave spherical face 15 of the end piece 14 with the air-space between it and the eddy-current disc 23 as small as mechanical tolerance will allow. The function or operation of the eddy current disc 23 will not be disturbed in any way by the damper disc 24 and deflections of the gyroscope 10 by the current in the control coils 16 will be unaltered. Any attempts by the gyroscope to oscillate, vibrate, or nutate about its axes in operation with flux passing across the air-gap from the control coils to the end plate 14, or vice versa, will produce eddy currents in the damper disc 24 which will oppose sweep or movement of the flux lines in any direction. The damper disc being fixed causes the reactive force to be applied to the flux opposing any motion of the poles 16. The nutational energy of the gyroscope is absorbed as $I^2R$ loss of the eddy current in the damper disc 24. Thus, any oscillatory or nutational movements of the gyroscope 10 are constantly damped out electrically in a novel manner without introducing any frictional factors.

While it is conceivable that other modifications and changes may be made in the constructional details and features of this invention without departing from the scope thereof, it is to be understood that the invention is described herein by reference to an illustrated preferred form without any intention of being limited thereby and I desire to be limited only by the scope of the appended claims.

I claim:

1. In a constrained gyroscope device adaptable to have flux established between the gyroscope frame element and the gyroscope element, a gyroscope oscillation damper means comprising an electrically conductive disc fixed on one of said elements in the flux path whereby any shift of position of flux will establish eddy currents in said conductive disc opposing the shift of the flux producing a damping action on the gyroscope element.

2. In a constrained gyroscope device adaptable to have flux established between the gyroscope element and the frame element through pole means fixed on one of the elements, a nutation damper comprising, a conductive disc fixed to the other of said elements in close air-spaced relation with said pole means in all relative rotative positions of the gyroscope and frame elements whereby nutations of the gyroscope element produces eddy currents in said conductor disc which affect the flux to oppose nutations of the gyroscope element.

3. In an encased gyroscope element gimbaled in a frame element for constrained movement about two perpendicular axes and adaptable to have flux established between the gyroscope case element and frame element through pole means fixed on one of said elements, a nutation damper comprising, a spherical conductive disc fixed to the other of said elements with the center of curvature thereof at the intersection of the two perpendicular axes and in close air-spaced relation with the pole means whereby flux is adapted to pass through said conductive disc and will produce eddy currents therein for relative movements of the elements operative to oppose such relative movements.

4. In an encased gyroscope element gimbaled in a frame element for constrained movement about two perpendicular axes and adaptable to have flux established between the gyroscope case element and the frame element through pole means fixed on the gyroscope case, the invention which comprises, a spherically concave conductive disc fixed with respect to the frame element with the center of curvature lying on the intersection of the perpendicular axes and in close air-spaced relation to the pole means whereby eddy currents produced in said conductive disc are operative to oppose rotational movements of the encased gyroscope about its axes.

5. A nutation damper for constrained gyroscopes comprising, a thin spherical electrically conductive gyroscope nutation damping disc adaptable to be fixed stationary to such a constrained gyroscope as has a flux path between the gyroscope case and frame, said disc being adapted to produce forces opposing relative movements between such gyroscope case and its frame as a result of eddy currents produced in said conductive disc.

References Cited in the file of this patent

UNITED STATES PATENTS

| 2,406,845 | Moore | Sept. 3, 1946 |
| 2,412,453 | Grimshaw | Dec. 10, 1946 |
| 2,417,689 | Johnson | Mar. 18, 1947 |
| 2,605,641 | Barkalow | Aug. 5, 1952 |
| 2,688,456 | Jensen | Sept. 7, 1954 |

FOREIGN PATENTS

| 1,109,543 | France | Sept. 28, 1955 |
| 597,188 | Great Britain | Jan. 20, 1948 |